United States Patent [19]
Kim

[11] Patent Number: 5,927,315
[45] Date of Patent: Jul. 27, 1999

[54] FUEL LEAKAGE PREVENTION APPARATUS

[75] Inventor: Jong-In Kim, Ansan, Rep. of Korea

[73] Assignee: Hyundai Motor Company, Rep. of Korea

[21] Appl. No.: 08/982,746

[22] Filed: Dec. 2, 1997

[30] Foreign Application Priority Data

Dec. 2, 1996 [KR] Rep. of Korea ..................... P96-61007
Dec. 2, 1996 [KR] Rep. of Korea ..................... P96-61008
Dec. 2, 1996 [KR] Rep. of Korea ..................... P96-61009

[51] Int. Cl.$^6$ ................................................. F16K 24/04
[52] U.S. Cl. ............................................ 137/43; 137/202
[58] Field of Search ...................................... 137/43, 202

[56] References Cited

U.S. PATENT DOCUMENTS 4,685,584  8/1987  Harris ..................................... 137/43 X
4,702,268  10/1987  Ambruster et al. ................... 137/43 X Primary Examiner—Gerald A. Michalsky
Attorney, Agent, or Firm—Christie, Parker & Hale, LLP

[57] ABSTRACT

A fuel leakage prevention apparatus comprising a body having a neck formed at the top and having a sealing surface at the bottom of the neck, a rib installed on the neck and having inclined upper surfaces at the top of the rib, a stopper plate extended inwardly from a lateral wall and having a center opening, and a plurality of vent holes formed at the bottom surface and the lateral surface of the body; a float located below the stopper plate of the body; a base mounted on the stopper plate and having a protruding rod extended through the center opening toward the float; spring means mounted on the base; sealing means mounted on the spring means and having a conical wing for sealing the sealing surface of the neck and a pushing rod formed at the top of the conical wing; and a ball located on the inclined upper surfaces of the rib of the body.

10 Claims, 5 Drawing Sheets

FUEL LEAKAGE PREVENTION APPARATUS

BACKGROUND OF THE INVENTION

1. Field of the Invention

This invention relates to the fuel tank of an automobile, and more particularly to a fuel leakage prevention apparatus for preventing liquid fuel leakage from the fuel tank to an evaporation pipe for discharging evaporated fuel to a canister.

2. Description of the Prior Art

Generally, the fuel supplying system of a gasoline engine comprises a fuel tank, a canister, a carburetor, etc.

A fuel tank 1 is an apparatus for storing and supplying liquid fuel to carburetor 8 and the fuel tank 1 includes a gassing-up gate 2, a feeding pipe 3 for supplying the stored fuel to carburetor 8, a reserver 5 installed at the top of a elevation pipe 4a for storing liquified fuel connected with an evaporation pipe 4 for discharging evaporated fuel to a canister 7 and a return pipe 6 for returning the liquified fuel at the reserver 5 to the tank 1.

The fuel stored in the fuel tank 1 is supplied to the carburetor 8 by a fuel pump (not shown) and is mixed with air in the carburetor 8. The mixture is supplied to cylinders 9 of the engine for combustion.

Meanwhile, exhaust gas of automobile includes harmful gases such as carbon monooxide CO, hydrocarbon HC, nitrogen oxides NOx. Especially, hydrocarbon is continuously generated at the fuel tank 1 and at the carburetor 8. The hydrogen carbon rises up through the elevation pipe 4a and passes the evaporation pipe 4 and is accumulated and stored at the canister 7 by being absorbed in activated carbons encased therein upon stopping and parking a car, and then is supplied for combustion to the carburetor 8 upon travelling.

Further, a fuel leakage prevention apparatus, which also functions as a discharging valve for venting the evaporated fuel generated in the fuel tank 1, is installed at the elevation pipe 4a or at the top of the fuel tank 1 connected with the elevation pipe 4a. Therefore, when a car is shaking, is gassing up, is turning around or is overturned, the fuel leakage prevention apparatus prevents the liquid fuel of fuel tank 1 from flowing into the evaporation pipe 4 and accumulating in the canister 7 which would cause a decline in the functionality of the canister 7 or allow hydrocarbons to diffuse to the atmosphere.

FIG. 2 shows a prior fuel leakage prevention apparatus.

As shown, the prior fuel leakage prevention apparatus is installed at the top of the fuel tank 1 connected with the evaporation pipe 4. The fuel leakage prevention apparatus comprises a cylindrical body 10 having a plurality of vent holes 11 and 12, a ball of heavy weight 13 located at the bottom of the body 10, a base plate 14 located on the ball 13, a coil spring 15 on the base 14, a float 16 located at the top of the coil spring and suspended upward. Meanwhile, a neck 18 shaped like a venturi pipe is formed at the top of the body 10. And a sealing surface 17 is formed for shutting off leakage of liquid fuel from the fuel tank 1 at the bottom surface of the neck 18 which contacts the float 16.

Therefore, the evaporated fuel generated in the fuel tank 1 passes the holes 11 and 12 of the body 10 and rises up to the evaporation pipe 4 through a gap between the float 16 and the body 10. And the evaporated fuel enters into evaporation pipe 4 and accumulates in the canister 7.

However, the float 16 can shake on the base 14 if the fuel in the fuel tank 1 shakes upon gassing up a car and upon travelling of a car since the gap between the body 10 and the float 16 have a considerable space for a gas passage.

For example, sealing between the float 16 and the sealing surface 17 becomes opened partially by shaking the fuel surface upon gassing up a car.

Therefore, there is a problem in the conventional fuel leakage prevention apparatus, in that when liquid fuel flows into the gap between the body 10 and the float 16 by shaking of the fuel, the apparatus could not shut off such fuel leakage so that the liquid fuel leaks from the apparatus and flows into the canister 7 along the evaporation pipe 4.

Further, when the car turns, the float 16 tilts in the body 10 thereby opening the sealing partially, and such opening also causes the fuel leakage.

Thus leaked fuel fills the canister and hinders the canister absorption of hydrocarbon, so hydrocarbon diffuses to the atmosphere and contributes to air pollution.

Accordingly, it is an object of the present invention to provide a fuel leakage prevention apparatus for effectively shutting off leakage of liquid fuel as well as allowing easy discharge of evaporated fuel.

SUMMARY OF THE INVENTION

In accordance with one object of the present invention, there is provided a fuel leakage prevention apparatus, the apparatus comprising:

a body having a neck formed at a top of the body and having a sealing surface at a bottom of the neck, a rib installed on the neck and having inclined upper surfaces at a top of the rib, a stopper plate extended inwardly from a lateral surface of the body and having a center opening, and a plurality of vent holes formed at a bottom surface and the lateral surface of the body;

a float located below the stopper plate of the body:

a base mounted on the stopper plate and having a protruding rod extended through the center opening toward the float;

spring means mounted on the base;

sealing means mounted on the spring means and having a conical wing for sealing the sealing surface of the neck and a pushing rod formed at a top of the conical wing; and a ball located on the inclined upper surfaces of the rib.

The present invention also provides a fuel leakage prevention apparatus, the apparatus comprising:

a body having a neck formed at a top of the body and having a sealing surface at a bottom of the neck, a rib installed on the neck and having inclined upper surfaces at a top of the rib, a stopper plate extended inwardly from a lateral surface of the body and having a center opening, and a plurality of vent holes formed at a bottom surface and the lateral surface of the body;

a float located below the stopper plate of the body;

a base plate mounted on the stopper plate and having a protruding rod extended through the center opening of the stopper plate toward the float;

spring means mounted on the base;

sealing means mounted on the spring means and having a disc for sealing the sealing surface of the neck and a pushing rod formed at an upper surface of the disc; and a ball located on the inclined upper surfaces of the rib.

The present invention also provides a fuel leakage prevention apparatus, the apparatus comprising:

a body having a neck formed at a top of the body and having a sealing surface at a bottom of the neck, a rib formed at a top of the neck and having inclined upper surfaces, a stopper plate formed at a bottom of the body and having a center opening, and a plurality of vent holes at a lateral surface of the body;

a base mounted on the stopper plate and having an extending rod extended through the center opening of the stopper plate;

a float installed at the extending rod for moving the base;

spring means mounted on the base;

sealing means mounted on the spring means and having a conical wing and a pushing rod formed at a top of the conical wing; and a ball located on the inclined upper surface of the rib.

The fuel leakage prevention apparatus according to the present invention is designed to prevent air pollution which is caused by liquid fuel of the fuel tank entering a canister through the evaporation pipe upon gassing up a car, upon shaking of a car or upon turning around a car.

BRIEF DESCRIPTION OF THE DRAWINGS

For fuller understanding of the nature and objects of the invention, reference should be made to the following detailed description taken in conjunction with the accompanying drawings in which.

DESCRIPTION OF THE PREFERRED EMBODIMENTS

The preferred embodiments of the present invention will now be described in detail with reference to the accompanying drawings.

Figure 1:
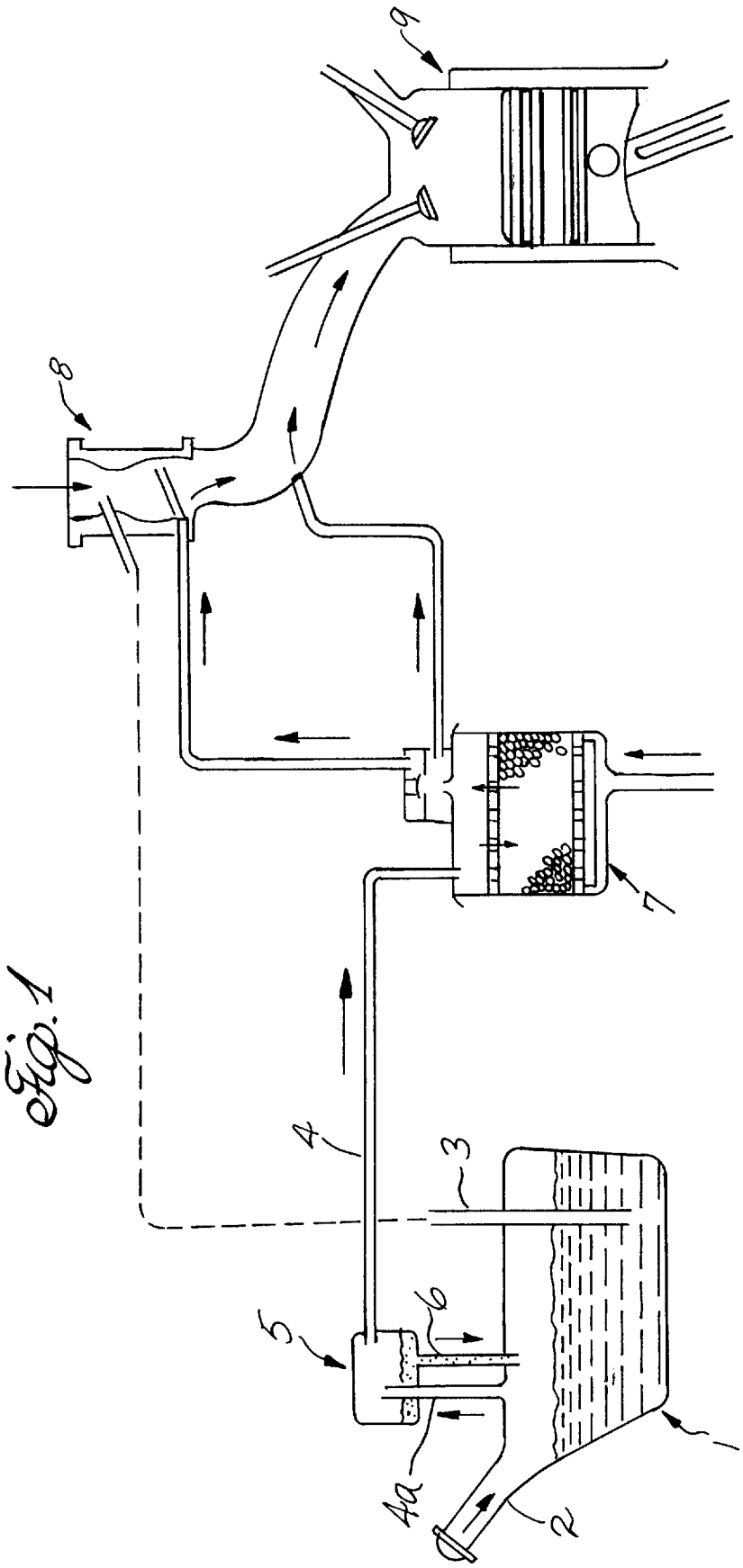
FIG. 1 is a schematic view of a fuel supply system of an automobile.
Figure 2:
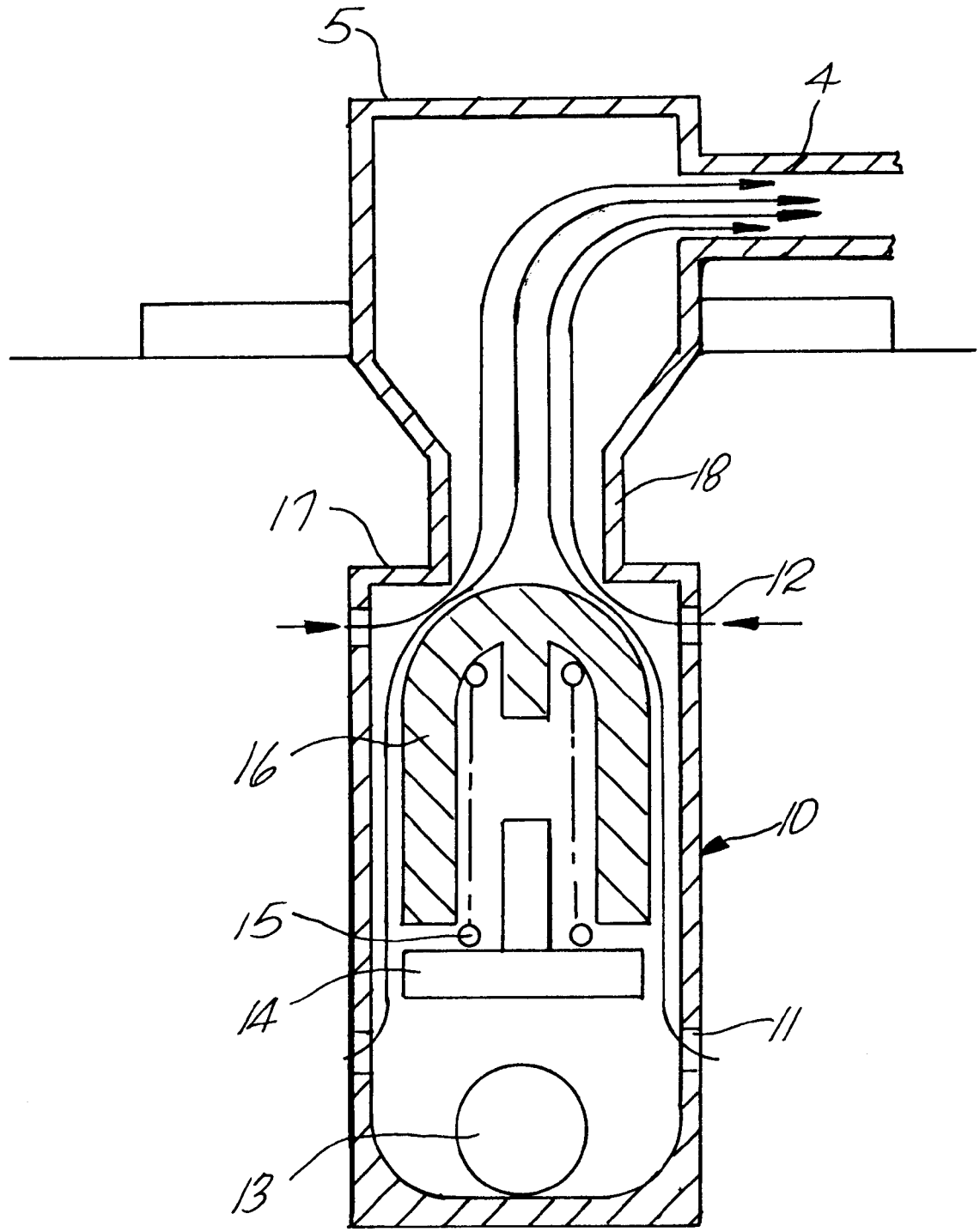
FIG. 2 is a cross-sectional view of a prior fuel leakage prevention apparatus.
Figure 3:
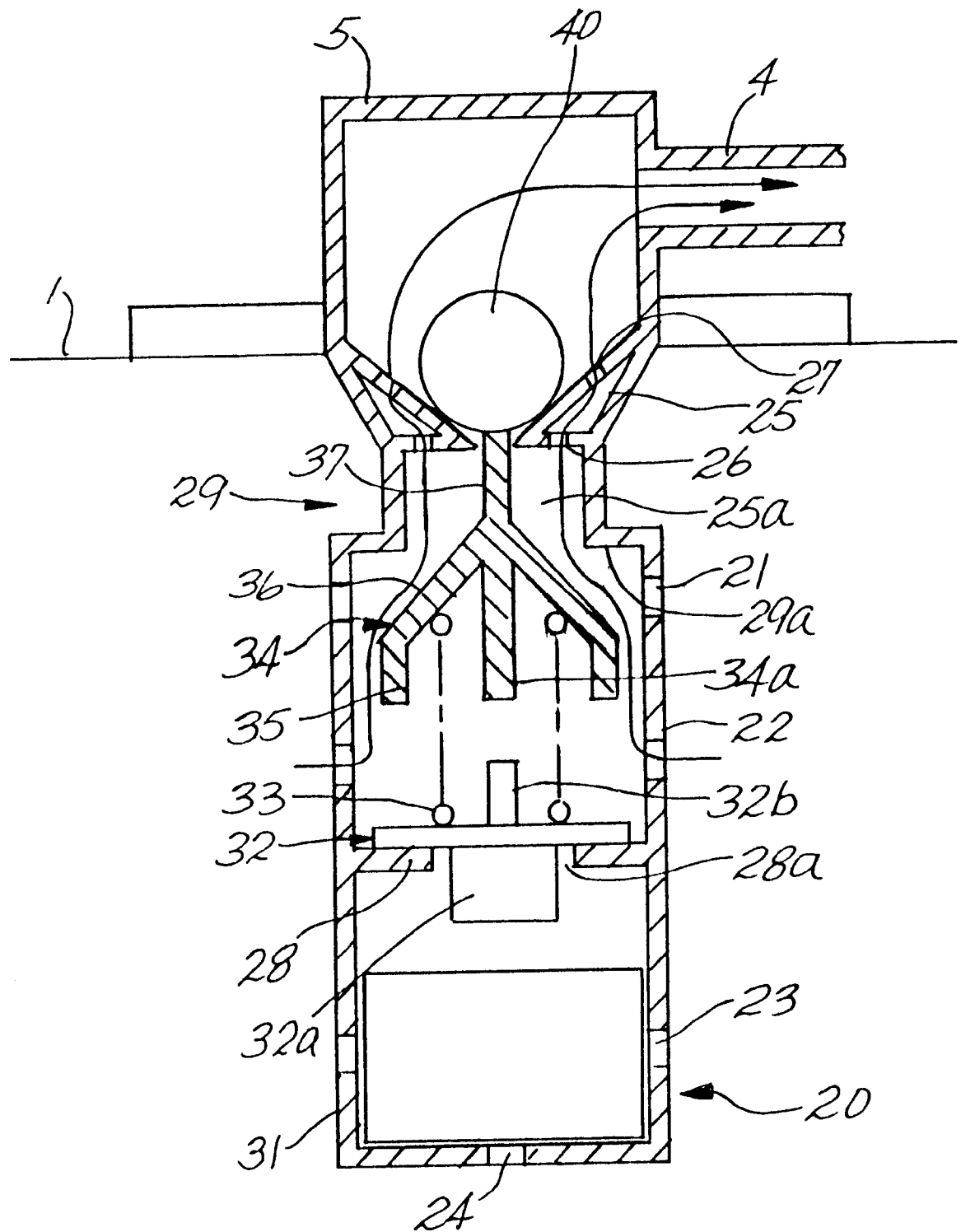
FIG. 3 is a cross-sectional view of a fuel leakage prevention apparatus according to the first embodiment of the present invention.

FIG. 3 shows a fuel leakage prevention apparatus according to the first embodiment of the present invention.

As shown, a fuel leakage prevention apparatus according to the first embodiment of the present invention comprises a body 20 installed at the top of the fuel tank 1 and connected with the reserver 5, and a fuel leakage prevention means installed in the body 20.

The body 20 of the invention has a plurality of vent holes 21, 22, 23 and 24 at the lateral cylindrical wall and the bottom wall, so the total ventilating area of the vent holes should be increased for easily ventilating the evaporated fuel.

Meanwhile, a neck 29 having a diameter smaller than that of the body 20 is formed at the top of the body 20. A sealing surface 29a is formed at the bottom surface of the neck 29 in order to seal the neck 29 together with a sealing means 34 explained hereinafter.

The body 20 has a stopper plate 28 extended inwardly from the cylindrical wall and having a center opening 28a. A rectangular float 31 is located below the stopper plate 28 on the bottom wall of the body 20.

A base 32 is mounted on the stopper plate 28 and has at the lower surface an end rod 32a extended toward the float 31 through the center opening 28a of the stopper plate 28 and has a supporting profusion 32b at the upper surface for supporting a coil spring 33 mounted thereon.

A coil spring 33 is mounted on the base 32, and a sealing means 34 is located on the spring 33 and suspended upwardly by the spring 33.

The sealing means 34 is a funnel-shaped member comprising a conical wing 36, a supporting protrusion 34a extended downwardly from a lower surface of the conical wing 36 for setting the spring 33, and a pushing rod 37 extended upwardly from the top of the conical wing 36.

A rib 25 is formed on the top of the neck 29, and has a lower plane surface and an upper inclined surface inclined downwardly having vent holes 26 and 27, respectively, through which evaporated fuel passes to the evaporation pipe 4.

Further, a ball 40 of metallic weight is located on the inclined upper surface of the rib 25, and pushes the pushing rod 37 of the sealing means 34 to open gas passage 25a by separating the sealing member 34 from the sealing surface 29a.

Therefore, the ball 40 of weight is used at the top of the apparatus for opening the sealing means 34, and the ball 40 is moved to the reserver 5 when a vehicle is overturned so that the sealing means 34 seals the gas passage 25a of the neck 29 by the weight of the sealing means 34, the base plate 32 and the float 24 in the fuel leakage prevention apparatus according to the present invention.

When the ball 40 is displaced from the pushing rod 37 of the sealing means 34, the sealing means 34 moves up by the spring 33 mounted between the sealing means 34 and the base plate 32 and contacts the sealing surface 29a of the neck 29 to prevent the liquid fuel overflow from the fuel tank 1 into the body 20 through holes 21, 22, 23 and 24 from entering the evaporation pipe 4.

However, when a vehicle travels without shaking, the ball 40 pushes the pushing rod 37 downwardly and presses the spring 33 to separate the sealing means 34 from the sealing surface 29a for opening the gas passage 25a.

Meanwhile, the inclined upper surface of the rib 25 is for preventing liquid fuel from overflowing to the evaporation pipe 4 when a car tilts upon rapidly turning and so on. For example, when a car tilts a predetermined angle, when the ball 40 moves along the inclined upper surface of the rib 25. So, the ball 40 separates from the pushing rod 37, the sealing means 34 moves up and the conical wing 36 seals the sealing surface 29a.

Further, when fuel surface increases temporarily by shaking the fuel upon gassing up a car or upon shaking of a car, the float 31 at the bottom of the body 20 moves up according to rise of the fuel surface and contacts the end rod 32a of the base plate 32 to push up the base plate 32. The raised base plate 32 pushes the sealing means 34 and the ball 40 upward, so that the conical wing 36 seals the sealing surface 29a to prevent liquid fuel from overflowing to the evaporation pipe 4.

When a car is overturned, the ball 40 drops into the reserver 5 to release the sealing means 34. So, the spring 33 is restored promptly, the conical wing 36 of the sealing means 34 seals the sealing surface 29a, and the base plate 32 and the float 31 press the sealing means 34 to further increase the seal.

Figure 4:
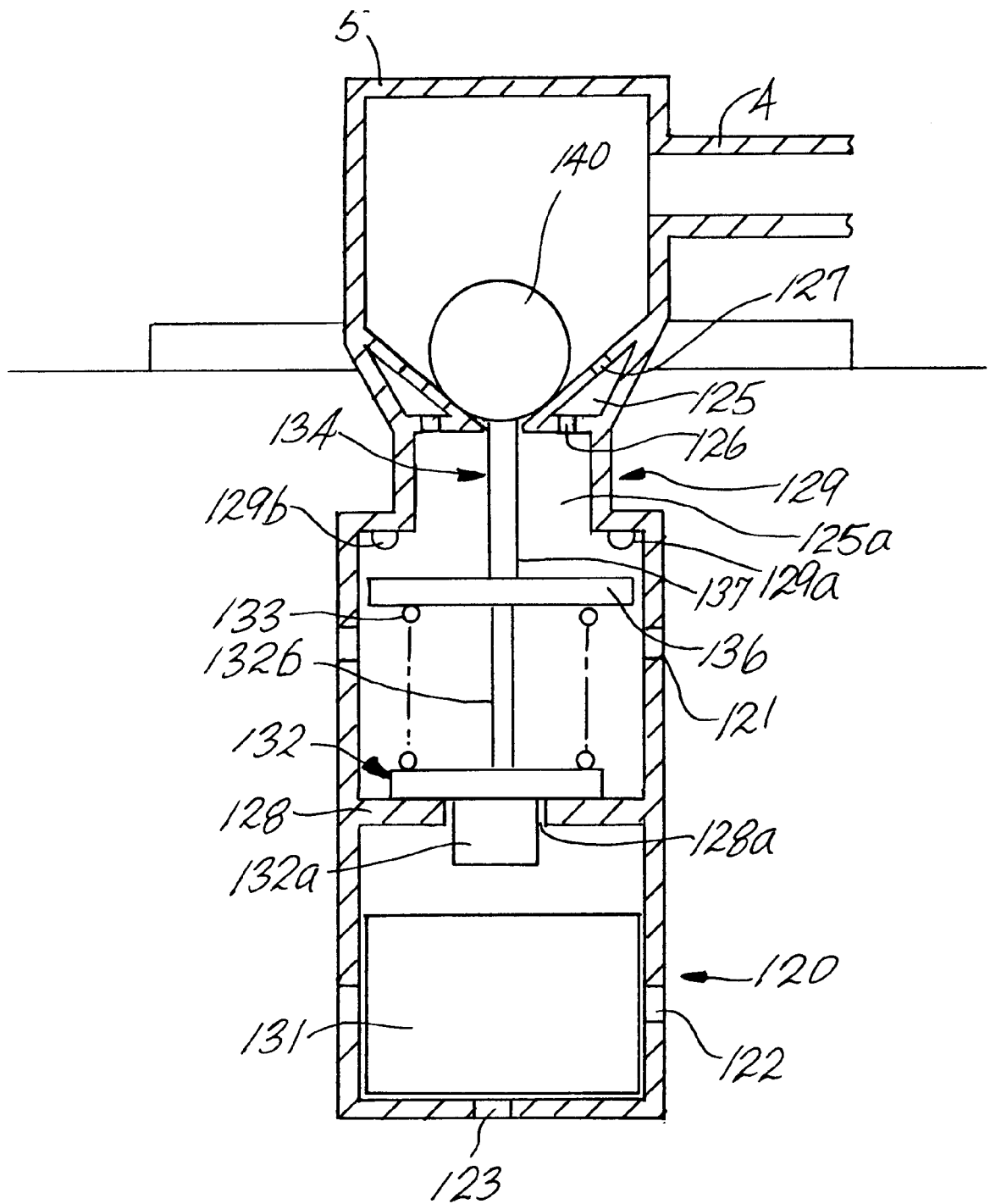
FIG. 4 is a cross-sectional view of a fuel leakage prevention apparatus according to the second embodiment of the present invention.

FIG. 4 shows a fuel leakage prevention apparatus according to the second embodiment of the present invention.

As shown, a fuel leakage prevention apparatus according to the second embodiment of the present invention comprises a body 120 installed at the top of the fuel tank 1 and connected with the reserver 5, and fuel leakage prevention means installed therein.

The body 120 of the invention has a plurality of holes 121, 122 and 123 at a lateral cylindrical wall and at the bottom wall, so the total ventilating area of the vent holes should be increased.

The body 120 has a stopper plate 128 extended inwardly from the cylindrical wall and having a center opening 128a. A rectangular float 131 is located below the stopper plate 128 on the bottom wall of the body 120.

A base plate 132 is installed on the stopper plate 128 and has an end rod 132a extended toward the float 131 through the center opening 128a of the stopper plate 128 and has a supporting protrusion 132b for supporting a spring 133 mounted thereon.

A coil spring 133 is mounted on the base plate 132, and a sealing means 134 is positioned on the spring 133.

The sealing means 134 comprises a disc 136 and a pushing rod 137 extended upward from the upper surface of the disc 136.

Meanwhile, a neck 129 having a diameter smaller than that of the body 120 is formed at the upper part of the body 120. A sealing surface 129a is formed at the bottom of the neck 129 in order to seal the neck 129 by contact with the sealing means 134.

A rib 125 is formed at the top of the neck 129, and has a lower surface and upper inclined surfaces inclined downward and having vent holes 126 and 127 respectively through which evaporated fuel passes to the evaporation pipe 4. Further, it is preferable to mount an O-ring 129b on the sealing surface 129a or on the disc 136 for improving the sealing effect between the disc 136 and the sealing surface 129a.

Further, a ball 140 of metallic weight is located on the inclined upper surface of the rib 125, and pushes down the pushing rod 137 of the sealing means 134 to open gas passage 125a by separating the sealing member 134 from the sealing surface 129a.

Therefore, the weight of the ball 140 is used at the top of the apparatus for pressing the sealing means 134, and the ball 140 is dropped to the reserver 5 when a vehicle is overturned so that the sealing means 134 closes the gas passage 125a by the weight of the sealing means 134, the base plate 132 and the float 131 in the fuel leakage prevention apparatus according to the present invention.

When the ball 140 is displaced from the pushing rod 137 of the sealing means 134, the sealing means 134 moves up by the spring 133 mounted between the sealing means 134 and the base plate 132 and contacts the sealing surface 129a of the neck 129 to prevent the fuel overflowed from the fuel tank 1 into the body 120 through vent holes 121, 122 and 123 from entering the evaporation pipe 4.

However, when a vehicle travels without shaking, the ball 140 pushes down the pushing rod 137 and presses the spring 133 to separate the sealing means 134 from the sealing surface 129a for opening the gas passage 125a.

Meanwhile, the inclined surface of the rib 125 prevents liquid fuel from overflowing to the evaporation pipe 4 when a car tilts upon rapidly turning and so on. When a car tilts about a predetermined angle, the ball 140 moves along the inclined upper surface of the rib 125. So, when the ball 140 is separated from the pushing rod 137, the sealing means 134 rises up and the disc 136 seals the sealing surface 129a.

Further, when the fuel surface increases temporarily by shaking of fuel upon gassing up a car or upon turning the car, the float 131 at the bottom of the body 120 moves up in accordance with the rise of the fuel surface and contacts the end rod 132a of the base plate 132 to push up the base plate 132. The raised base plate 132 pushes the sealing means 134 and the ball 140 upwardly, so that the disc 136 seals the sealing surface 129a to prevent liquid fuel from overflowing to the evaporation pipe 4.

When a car is overturned, the ball 140 moves into the reserver 5 to release the sealing means 134. So, the spring 133 is restored promptly, the disc 136 of the sealing means 134 closes the sealing surface 129a, and the base plate 132 and the float 131 press the sealing means 134 to further increase the seal.

Figure 5:
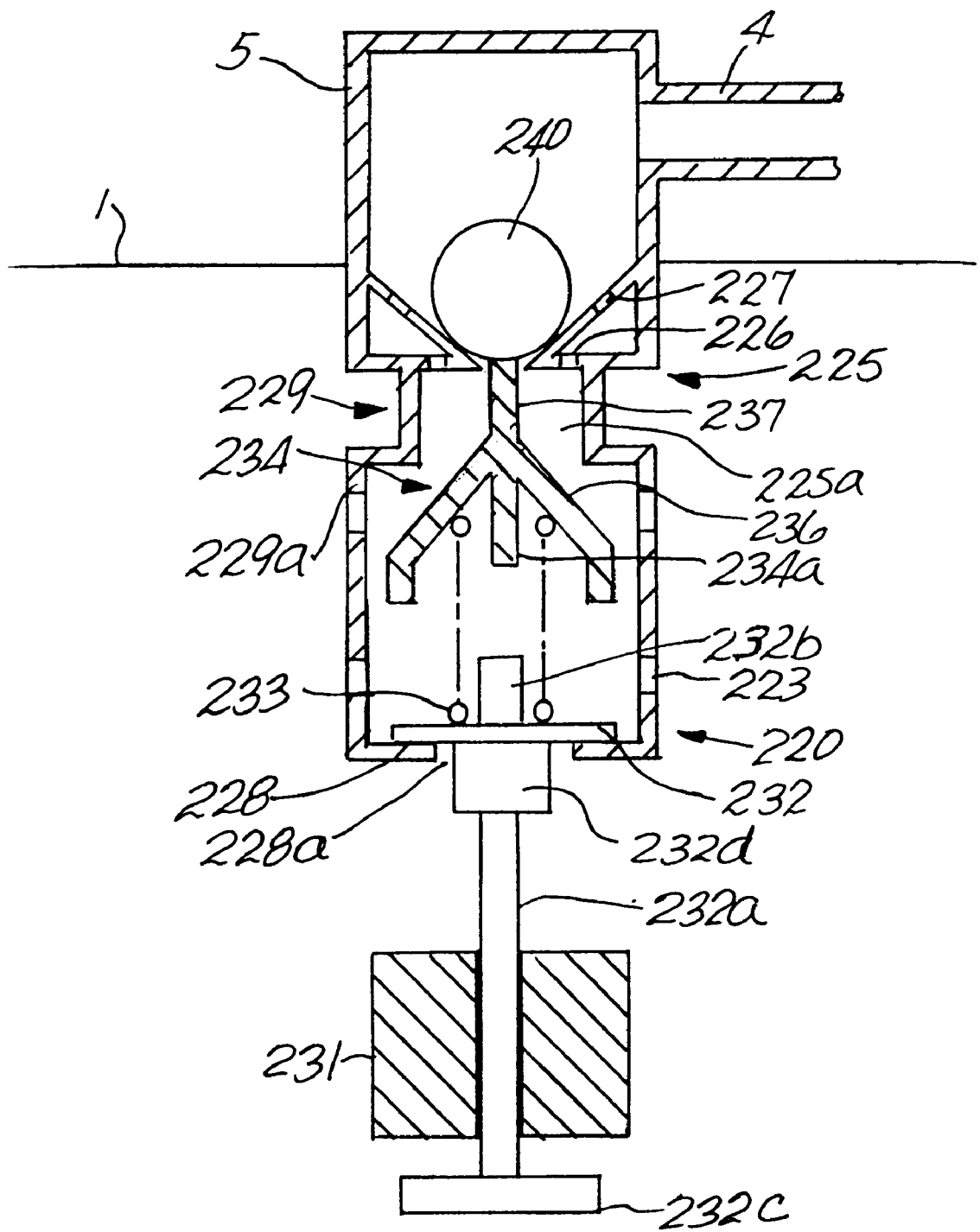
FIG. 5 is a cross-sectional view of a fuel leakage prevention apparatus according to the third embodiment of the present invention.

FIG. 5 shows a fuel leakage prevention apparatus according to the third embodiment of the present invention.

As shown, a fuel leakage prevention apparatus according to the present invention comprises a body 220 installed at the top of the fuel tank 1 and connected with the reserver 5, and a fuel leakage prevention means installed therein.

The body 220 of the invention has a plurality of holes 221 and 223 at a cylindrical lateral wall, so the total ventilating area of the vent holes should be increased.

The body 220 has a stopper plate 228 having a center opening 228a at the bottom.

A base plate 232 is installed on the stopper plate 228 and has an extending rod 232a extended from the lower surface of the base plate 232 towards the fuel tank 1 through the center opening 228a of the stopper plate 228 and having a supporting protrusion 232b for supporting a spring 233 mounted thereon. The extending rod 232a has a contacting end 232d at the top and an enlarged end 232c at the bottom.

A rectangular float 231 is fixed around the extending rod 232a or inserted in the extending rod 232a movable slidingly therealong.

A coil spring 233 is mounted on the base plate 232, and a sealing means 234 is located on the spring 233.

The sealing means 234 is a funnel-shaped member comprising a conical wing 236, and a pushing rod 237 extended upwardly from the top of the conical wing 236. It is preferable to form a supporting protrusion 234a extended downwardly from the lower surface of the conical wing 236 for setting the spring 233.

Meanwhile, a neck 229 has a diameter smaller than that of the body 220. A sealing surface 229a is formed at the bottom of the neck 229 in order to seal the neck 229 together with the sealing means 234.

A rib 225 is formed on the top of the neck 229, and has a lower plane surface and an upper inclined surface inclined downwardly having holes 226 and 227, respectively, through which evaporated fuel gas passes to the evaporation pipe 4.

Further, a ball 240 of metallic weight is located on the inclined upper surface of the rib 225 and pushes down the pushing rod 237 of the sealing means 234 to open gas passage 225a by separating the sealing member 234 from the sealing surface 229a.

Therefore, the weight of the ball 240 is used at the top of the apparatus for opening the sealing means 234, and the ball 240 is moved to the reserver 5 when a vehicle is overturned so that the sealing means 234 seals the gas passage 225a of the neck 229 by the weight of the sealing means 234, the base plate 232 and the float 231 in the fuel leakage prevention apparatus according to the present invention.

When the ball 240 is displaced from the pushing rod 237 of the sealing means 234, the sealing means 234 moves up by the spring 233 mounted between the sealing means 234 and the base plate 232 and contacts the sealing surface 229a of the neck 229 to prevent the fuel overflow from the fuel tank 1 into the body 220 through vent holes 221 and 223 from entering the evaporation pipe 4.

However, when a vehicle travels without shaking, the ball 240 pushes the pushing rod 237 downwardly and presses the spring 233 to separate the sealing means 234 from the sealing surface 229a for opening the gas passage 225a.

Meanwhile, the inclined surface of the rib 225 prevents liquid fuel from overflowing to the evaporation pipe 4 when a car tilts upon rapidly turning and so on.

For example, when a car tilts about a predetermined angle, the ball 240 moves along the inclined upper surface of the rib 225. So, the ball 240 is separated from the pushing rod 237, the sealing means 234 moves up and the conical wing 236 contacts the sealing surface 229a for closing the gas passage 225a.

Further, when the fuel surface increases temporarily by shaking of fuel in the fuel tank 1 upon gassing up a car or upon turning the car, the float 231 at the bottom of the body 220 moves up along the extending rod 232a according to the fuel and contacts the contacting end 232d of the extending rod 232a to push up the base plate 232. The raised base plate 232 pushes the sealing means 234 and the ball 240 upward, so that the conical wing 236 seals the sealing surface 229a to prevent liquid fuel from overflowing to the evaporation pipe 4.

When a car is overturned, the ball 240 drops into the reserver 5 to release the sealing means 234. So, the spring 233 is restored promptly, the conical wing 236 of the sealing means 234 seals the sealing surface 229a, and the base plate 232 and the float 231 presses the sealing means 234 to further increase the seal.

Numerous modifications and variations of the present invention are possible in light of the above teachings. It is therefore to be understood the invention is defined by the scope of the appended claims, and the invention may be practiced in ways other than those in the intent and teachings of the invention.

What is claimed is:

1. A fuel leakage prevention apparatus, the apparatus comprising:

a body having a neck formed at a top of the body and having a sealing surface at a bottom of the neck, a rib installed on the neck and having inclined upper surfaces at a top of the rib, a stopper plate extended inwardly from a lateral surface of the body and having a center opening, and a plurality of vent holes formed at a bottom surface and the lateral surface of the body;

a float located below the stopper plate of the body;

a base mounted on the stopper plate and having a protruding rod extended through the center opening toward the float;

spring means mounted on the base;

sealing means mounted on the spring means and having a conical wing for sealing the sealing surface of the neck and a pushing rod formed at a top of the conical wing; and a ball located on the inclined upper surfaces of the rib.

2. The apparatus as claimed in claim 1, wherein said rib has a plurality of penetrating vent holes opened to the inclined upper surfaces.

3. The apparatus as claimed in claim 1 wherein said spring means is a coil spring and said base has a support protrusion at an upper surface of said base and said sealing means has a support protrusion at a lower surface of said sealing means for supporting the coil spring therebetween.

4. A fuel leakage prevention apparatus, the apparatus comprising:

a body having a neck formed at a top of the body and having a sealing surface at a bottom of the neck, a rib installed on the neck and having inclined upper surfaces at a top of the rib, a stopper plate extended inwardly from a lateral surface of the body and having a center opening, and a plurality of vent holes formed at a bottom surface and the lateral surface of the body;

a float located below the stopper plate of the body;

a base plate mounted on the stopper plate and having a protruding rod extended through the center opening of the stopper plate toward the float;

spring means mounted on the base;

sealing means mounted on the spring means and having a disc for sealing the sealing surface of the neck and a pushing rod formed at an upper surface of the disc; and a ball located on the inclined upper surfaces of the rib.

5. The apparatus as claimed in claim 4, wherein said sealing surface of the neck has an O-ring mounted thereon.

6. The apparatus as claimed in claim 4, wherein said spring means is a coil spring and said base plate has a support protrusion at an upper surface of said baseplate for supporting the coil spring.

7. A fuel leakage prevention apparatus, the apparatus comprising:

a body having a neck formed at a top of the body and having a sealing surface at a bottom of the neck, a rib formed at a top of the neck and having inclined upper surfaces, a stopper plate formed at a bottom of the body and having a center opening, and a plurality of vent holes at a lateral surface of the body;

a base mounted on the stopper plate and having an extending rod extended through the center opening of the stopper plate;

a float installed at the extending rod for moving the base; spring means mounted on the base;

sealing means mounted on the spring means and having a conical wing and a pushing rod formed at a top of the conical wing; and a ball located on the inclined upper surface of the rib.

8. The apparatus as claimed in claim 7 wherein said extending rod has a contacting end at a top of said extending rod and an enlarged end at a bottom of said extending rod and said float is mounted around the extending rod to be able to slide along the extending rod.

9. The apparatus as claimed in claim 7 wherein said rib has a plurality of penetrating vent holes opened to the inclined upper surfaces.

10. The apparatus as claimed in claim 7 wherein said spring means is a coil spring and said base has a support protrusion at an upper surface of said base and said sealing means has a support protrusion at a lower surface of said sealing means for supporting the coil spring therebetween.

* * * * *